(12) United States Patent
Oesterling et al.

(10) Patent No.: US 7,483,772 B2
(45) Date of Patent: Jan. 27, 2009

(54) SYSTEM FOR REMOTELY OPERATING VEHICLE FUNCTIONS

(75) Inventors: Christopher L. Oesterling, Troy, MI (US); Shpetim S. Veliu, Livonia, MI (US); Hitan S. Kamdar, Utica, MI (US); Russell A. Patenaude, Macomb Township, MI (US); Brad T. Reeser, Lake Orion, MI (US); Anthony J. Sumcad, Southfield, MI (US)

(73) Assignee: General Motors Corporation, Detroit, MI (US)

( * ) Notice: Subject to any disclaimer, the term of this patent is extended or adjusted under 35 U.S.C. 154(b) by 404 days.

(21) Appl. No.: 11/048,550

(22) Filed: Feb. 1, 2005

(65) Prior Publication Data

US 2006/0173587 A1      Aug. 3, 2006

(51) Int. Cl.
*G08C 19/12* (2006.01)
*B60R 25/10* (2006.01)
*G06F 7/00* (2006.01)
*G06F 17/00* (2006.01)

(52) U.S. Cl. .............. 701/2; 701/36; 701/49; 340/426.36; 340/426.13; 341/173

(58) Field of Classification Search .............. 701/36, 701/1, 49, 2; 341/173; 340/5.54, 5.561, 340/5.64, 426.14, 426.16, 426.36; 709/217
See application file for complete search history.

(56) References Cited

U.S. PATENT DOCUMENTS

| 6,873,824 | B2 * | 3/2005 | Flick ........................ 455/41.2 |
| 7,123,127 | B2 * | 10/2006 | Mosgrove et al. .......... 340/5.21 |
| 2002/0140545 | A1 * | 10/2002 | Nietupski et al. .......... 340/5.72 |
| 2003/0130001 | A1 * | 7/2003 | Weisshaar et al. .......... 455/510 |
| 2005/0088280 | A1 * | 4/2005 | Beehler et al. ............. 340/5.62 |
| 2007/0057810 | A1 * | 3/2007 | Bos et al. ............... 340/825.69 |

FOREIGN PATENT DOCUMENTS

JP     2000-324252    * 11/2000

* cited by examiner

*Primary Examiner*—Thomas G Black
*Assistant Examiner*—Christine M Behncke

(57) ABSTRACT

A method for remotely operating vehicle functions including receiving at least one wireless key fob signal at a kiosk system, receiving a vehicle function request at the kiosk system, and sending the wireless key fob signal from the kiosk system to a vehicle based on the vehicle function request.

15 Claims, 6 Drawing Sheets

SYSTEM FOR REMOTELY OPERATING VEHICLE FUNCTIONS

FIELD OF THE INVENTION

This invention relates generally to a system to remotely operate vehicle functions. In particular, the invention relates to providing vehicle functions responsive to a vehicle function request from a kiosk system.

BACKGROUND OF THE INVENTION

When a user of a vehicle loses the keys to the vehicle or locks the keys in the vehicle equipped with a telematics device, the user may use the telematics unit installed in the vehicle to provide a vehicle unlock service. If a user of a vehicle in a large parking garage forgets where a vehicle was parked, the user can use the telematics unit installed in the vehicle to honk the horn and flash the car lights until the user locates the car by following the sound of the horn and seeing the flashing lights.

In some cases, a telematics unit is not installed in the vehicle. In other cases, the wireless signal required by the telematics unit is inaccessible at the vehicle location. For example, in some underground garages the telematics unit cannot receive a wireless signal. In other cases, certain functions of the telematics unit are inoperable.

It is desirable to remotely provide the vehicle functions for vehicles that do not have an installed telematics unit, or without an appropriately functioning telematics unit. It is also desirable to remotely provide the vehicle functions for vehicles with installed telematics units when the vehicles are parked in locations inaccessible to the wireless communication required for the telematics unit.

SUMMARY OF THE INVENTION

One aspect of the present invention provides a method for remotely operating vehicle functions including receiving at least one wireless key fob signal at a kiosk system, receiving a vehicle function request at the kiosk system, and sending the wireless key fob signal from the kiosk system to a vehicle based on the vehicle function request.

A second aspect of the present invention provides a computer readable medium storing a computer program including computer readable code operable for receiving at least one wireless key fob signal at a kiosk system, for receiving a vehicle function request at the kiosk system and for sending the wireless key fob signal from the kiosk system to a vehicle based on the vehicle function request.

A third aspect of the present invention provides a system for remotely operating vehicle functions. The system includes means for receiving at least one wireless key fob signal at a kiosk system, means for receiving a vehicle function request at the kiosk system and means for sending the wireless key fob signal from the kiosk system to a vehicle based on the vehicle function request.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

Various embodiments of the present invention are illustrated by the accompanying figures, wherein.

DETAILED DESCRIPTION OF THE PRESENTLY PREFERRED EMBODIMENTS

Figure 1:
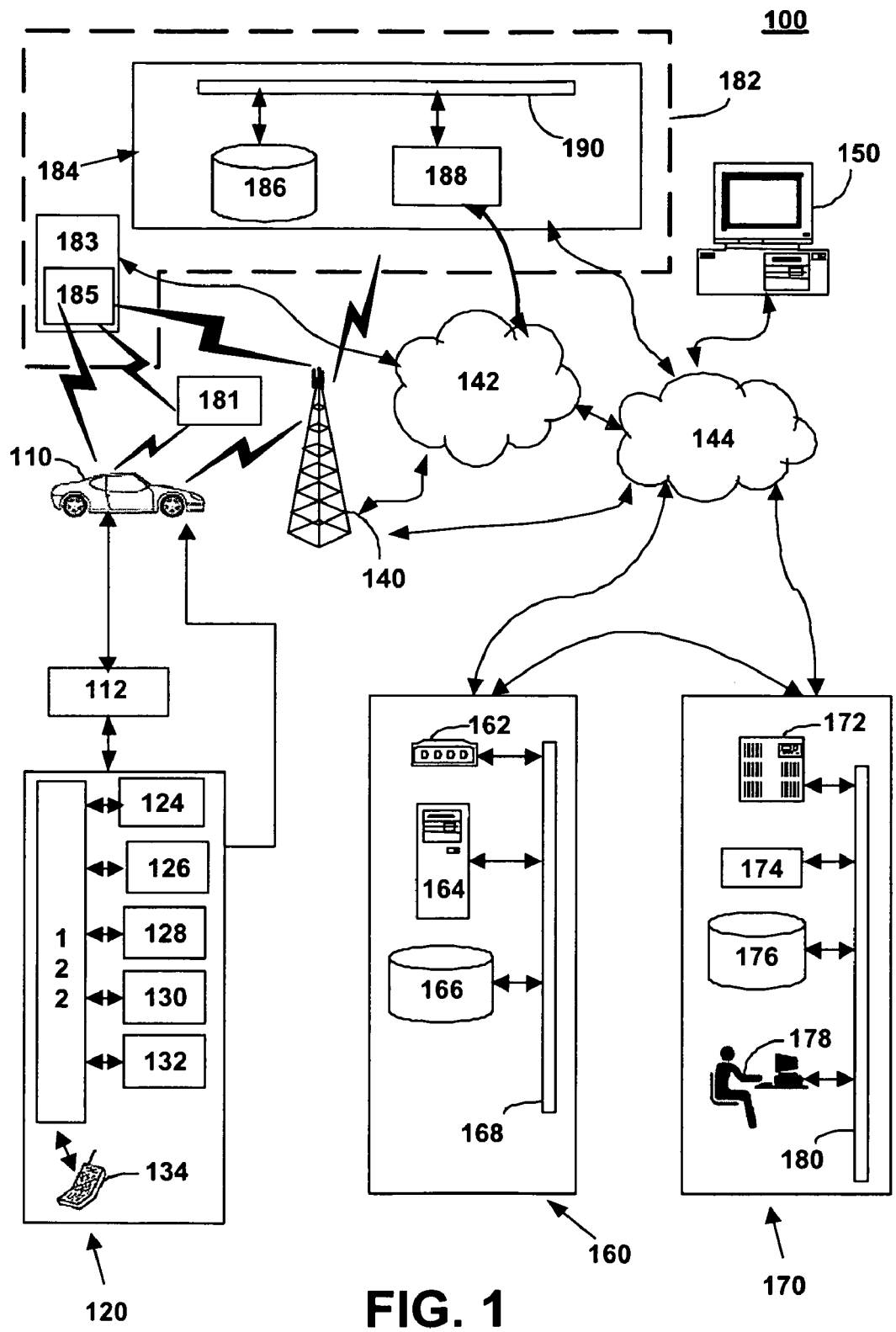
FIG. 1 is a schematic diagram of a system for providing access to a kiosk system to remotely operate functions in a mobile vehicle.

FIG. 1 illustrates one embodiment of system for data transmission over a wireless communication system, in accordance with the present invention at 100. Mobile vehicle communication system (MVCS) 100 includes a mobile vehicle communication unit (MVCU) 110, a vehicle communication network 112, a telematics unit 120, one or more wireless carrier systems 140, one or more communication networks 142, one or more land networks 144, one or more client, personal or user computers 150, one or more web-hosting portals 160, and/or one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 may also be referred to as a mobile vehicle throughout the discussion below. In operation, MVCU 110 may be implemented as a motor vehicle, a marine vehicle, or as an aircraft. MVCU 110 may include additional components not relevant to the present discussion.

Vehicle communication network 112 sends signals between various units of equipment and systems (detailed below) within MVCU 110 to perform various functions such as unlocking a door, opening the trunk, setting personal comfort settings, and calling from telematics unit 120. In facilitating interactions among the various communication and electronic modules, vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

MVCU 110, via telematics unit 120, sends and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS)

unit 126, an in-vehicle memory 128, a microphone 130, one or more speakers 132, and an in-vehicle mobile phone 134. In other embodiments, telematics unit 120 may be implemented without one or more of the above listed components, such as, for example, a microphone 130 or speakers 132. Telematics unit 120 may include additional components not relevant to the present discussion.

Processor 122 is implemented as a microcontroller, microprocessor, controller, host processor, or vehicle communications processor. In one embodiment, processor 122 is a digital signal processor (DSP). In an example, processor 122 is implemented as an application specific integrated circuit (ASIC). In another embodiment, processor 122 is implemented as a processor working in conjunction with a central processing unit (CPU) performing the function of a general purpose processor. GPS unit 126 provides longitude and latitude coordinates of the vehicle responsive to a GPS broadcast signal received from one or more GPS satellite broadcast systems (not shown). The in-vehicle mobile phone 134 is a cellular-type communication device, such as, for example, an analog, digital, dual-mode, dual-band, multi-mode or multi-band cellular phone.

Processor 122 executes various computer programs that control programming and operational modes of electronic and mechanical systems within MVCU 110. Processor 122 controls communications (e.g. call signals) between telematics unit 120, wireless carrier system 140, and call center 170. In one embodiment, a voice-recognition application is installed in processor 122 that can translate human voice input through microphone 130 to digital signals. Processor 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers. In this embodiment, signals from processor 122 are translated into voice messages and sent out through speaker 132.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal or user computer 150 includes a computer usable medium to execute Internet browser and Internet-access computer programs for sending and receiving data over land network 144 and optionally, wired or wireless communication networks 142 to web-hosting portal 160. Personal or client computer 150 sends user preferences to web-hosting portal through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110. In operation, a client utilizes computer 150 to initiate setting or re-setting of user-preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and from modem 162, data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station pre-set selections, climate controls, custom button configurations and theft alarm settings. For each client, the web server potentially stores hundreds of preferences for wireless vehicle communication, networking, maintenance and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services, including enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data to telematics unit 120 in MVCU 110 through wireless carrier system 140, communication network 142, land network 144, voice and data switch 172, and/or network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g. a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicate with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

A kiosk system 182, shown in communication with the MVCS 100, includes one or more kiosk server 184 and one or more kiosks 183. The kiosk 183 includes a kiosk antenna 185 operable to transmit wireless signals to nearby MVCUs 110. The kiosk antenna 185 includes one or more transceivers. In one embodiment, kiosk antenna 185 is configured to transmit short-range radio signals that conform to the requirements of FCC Part 15, such as 802.11 signals.

The kiosk server 184 includes a kiosk server bus 190, one or more system databases 186, and one or more kiosk server processors 188. The kiosk server 184 is in communication with kiosks 183 via one or more wireless carrier systems 140, one or more communication networks 142, one or more land networks 144, one or more client, personal or user computers 150, one or more web-hosting portals 160, and/or one or more call centers 170. The kiosk server bus 190 sends signals between the kiosk server processor 188, and the system databases 186 in the kiosk server 184. The kiosks 183 are operable to receive wireless signals from a key fob 181 and to transmit wireless signals to the MVCU 110. The kiosks 183 are operable to receive enrollment requests, and vehicle function requests as direct input from a user or a kiosk attendant. The key fob 181 is operable to transmit wireless signals to the MVCU 110 to perform various vehicle functions including flashing the headlights, sounding the horn, opening the trunk and unlocking the door. The key fob 181 is operable to transmit wireless signals, including a vehicle key code, to the kiosks 183 as part of an enrollment request. In one embodiment, the key fob 181 is configured to transmit short-range wireless signals, such as a radio signal. In another embodiment, key fob 181 is configured to transmit low power radio signals intended for transmission over the geographic region in the vicinity of the transmission. In one embodiment, key fob 181 is configured to transmit signals over a distance of 100 yards.

Figure 2:
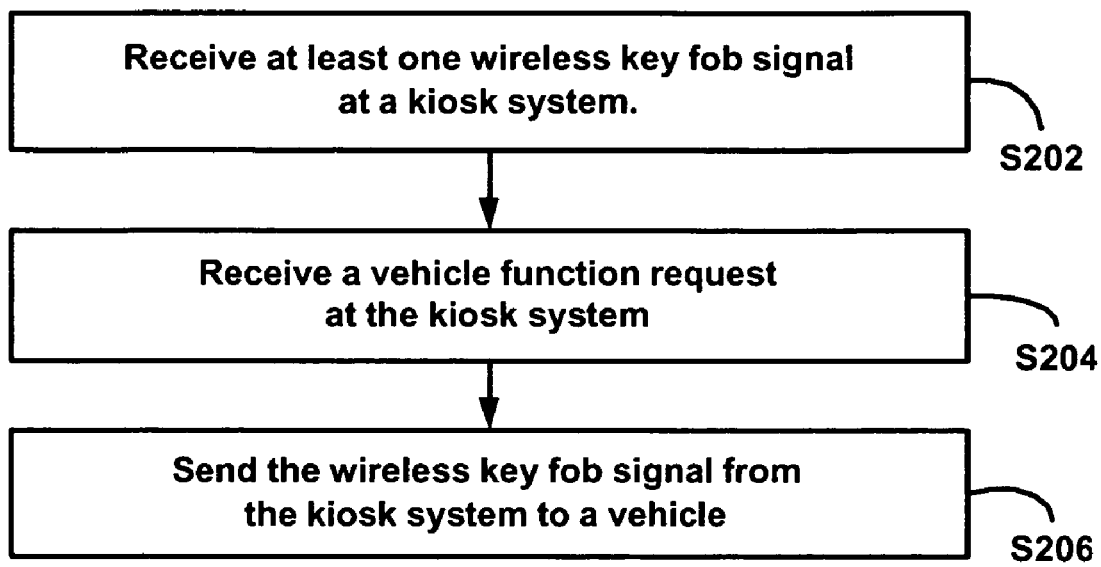
FIG. 2 illustrates a method for remotely operating vehicle functions in accordance with the present invention.

FIG. 2 illustrates a method 200 representative of one embodiment of the first portion of a method of remotely operating vehicle functions in accordance with the present invention. The kiosk server 184, the kiosk server processor 188, the system databases 186, the kiosk 183, transceivers in the kiosk antennae 185 and the key fobs 181 have stored in computer readable medium at least one computer program including computer readable code to perform the operations described with reference to method 200.

During stage S202, the kiosk system 182 receives at least one wireless key fob signal from a key fob 181. One embodiment of a method of receiving at least one wireless key fob signal from a key fob 181 is described in detail below in reference to method 300 of FIG. 3.

During stage S204, the kiosk system 182 receives a vehicle function request from a user of an MVCU 110. The vehicle function request can be a request to unlock an MVCU 110 or a request to open the trunk, sound the horn and/or flash the lights of the MVCU 110. For example, if a user is locked out of the MVCU 110, the user makes a vehicle function request to unlock the MVCU 110. Alternatively, if a user has forgotten where the MVCU 110 is parked, the user makes a vehicle function request to flash the lights and sound the horn of the MVCU 110. In one embodiment, the MVCU 110 does not include a telematics unit 120.

There are several ways for a user to make a vehicle function request with the kiosk system 182. Three example methods of providing the vehicle function request at the kiosk system 182 are described in detail below in reference to method 400 of FIG. 4.

During stage S206, the kiosk system 182 sends the wireless key fob signal, received during stage S202, to the MVCU 110 based on the vehicle function request. A vehicle function request prompts a kiosk 183 located in the vicinity of the MVCU 110 to send the wireless key fob signal to the MVCU 110. The wireless key fob signal sent from the kiosk 183 to the MVCU 110 is operable to perform the requested vehicle functions. The method of sending the wireless key fob signal to the MVCU 110 is described in detail below in reference to method 500 of FIG. 5.

The methods 300, 400, 500 and 600 described with reference to FIGS. 3-6, respectively, together provide details of one embodiment of a method for remotely operating vehicle functions in a vehicle 110.

Figure 3:
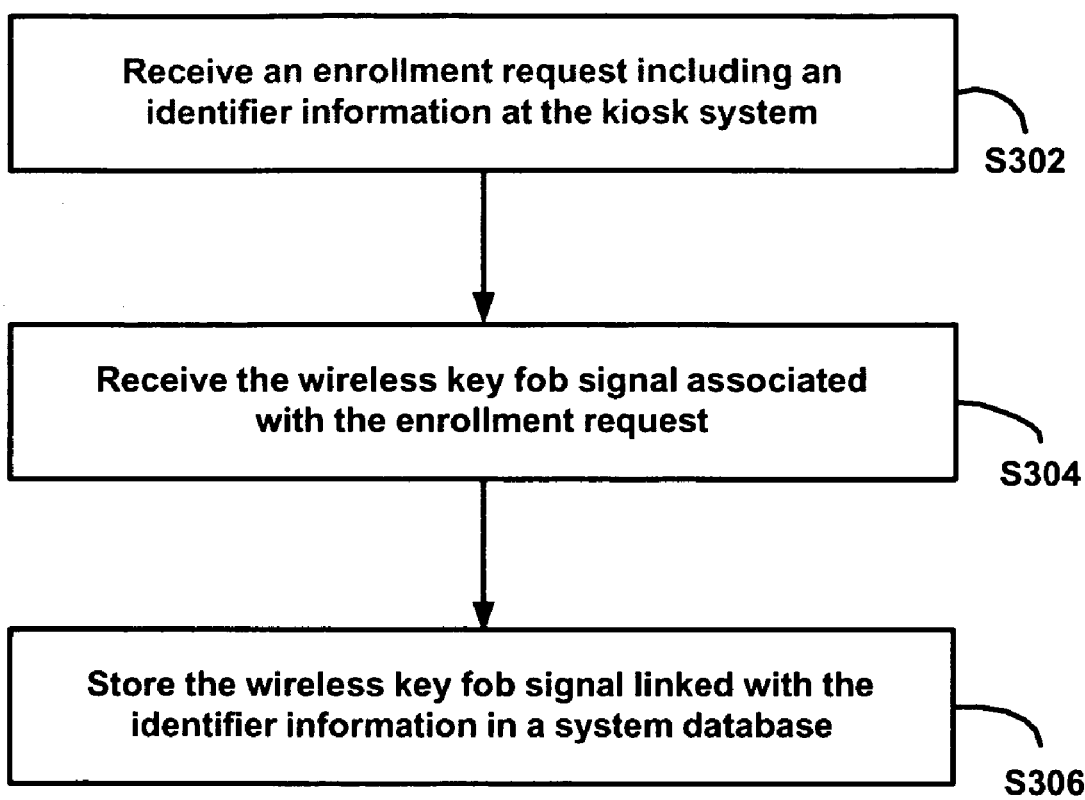
FIG. 3 illustrates a method for receiving a wireless key fob signal in accordance with the present invention.

FIG. 3 illustrates one embodiment of a method 300 for receiving a wireless key fob signal, in accordance with the present invention. The kiosk server 184, the kiosk server processor 188, the system databases 186, the kiosks 183, transceivers in the kiosk antennae 185 and the key fobs 181 have stored in computer readable medium at least one computer program including computer readable code to perform the operations described with reference to method 300.

During stage S302, the kiosk system 182 receives an enrollment request including identifier information. In one embodiment, the user of the MVCU 110 initiates the enrollment request at a kiosk 183 so that the MVCU 110 can be remotely operated by the kiosk system 182 from any one of the kiosks 183 in the kiosk system 182. In another embodiment, the user initiates enrollment near the kiosk 183, or using computer 150.

In one embodiment, one or more button pushes on a kiosk keypad (not shown) by the user initiates the enrollment request. The identifier information includes one or more of a vehicle identification number, a customer number associated with the vehicle, a social security number, a password, a security code and a personal identification number. One or more button pushes on a kiosk keypad by the user enter the identifier information at the kiosk 183. In other embodiments, initiation starts with button pushes or other inputs from a user at, for example, a dealership, a user's home using computer 150, or other means. In one embodiment, billing information is included with the enrollment request. Billing information includes, for example, credit card or debit card information or subscription information indicative of a current subscription to a service.

During stage S304, the kiosk system 182 receives a wireless key fob signal, and associates the received key fob signal with the enrollment request. During the enrollment process, the kiosk 183 prompts the user to press one or more buttons on the key fob 181 to emit one or more wireless key fob signals, while the user is positioned within wireless reception range of the kiosk antenna 185.

For example, when the user presses the unlock button on the key fob 181 while within an appropriate distance (i.e. the signal is able to be received) of the MVCU 110 and a kiosk 183, the emitted wireless key fob signal received at the MVCU 110 and the kiosk 183 is operable to unlock the MVCU 110. In another example, when the user presses additional buttons on the key fob 181 in the vicinity of the MVCU and a kiosk 183, the emitted wireless key fob signal received at the MVCU 110 and the kiosk 183 is operable to open the trunk, flash the lights and/or sound the horn of the MVCU 110. In the event that multiple signals are received during enrollment, and the signals are different, the kiosk engages in an error check routine. In one embodiment, the error check routine measures the relative strength of each received signal, and selects the strongest signal as the emitted wireless key fob signal.

During stage S306, the kiosk 183 links the one or more received wireless key fob signals received during stage S304 with the identifier information received during stage S302. Then kiosk 183 transmits the linked wireless key fob signal and the identifier information to a kiosk server 184 in the kiosk system 182. The kiosk server processor 188 stores the wireless key fob signal linked with the identifier information in a system database 186. The kiosk 183 transmits the wireless key fob signal linked with the identifier information to the kiosk server processor 188 via one or more wireless carrier systems 140, one or more communication networks 142, and/or one or more land networks 144. The kiosk 183 can have a hardwire connection to a transceiver, which is operable to communicate with the one or more wireless carrier systems 140, one or more communication networks 142, and/or one or more land networks 144.

Figure 4:
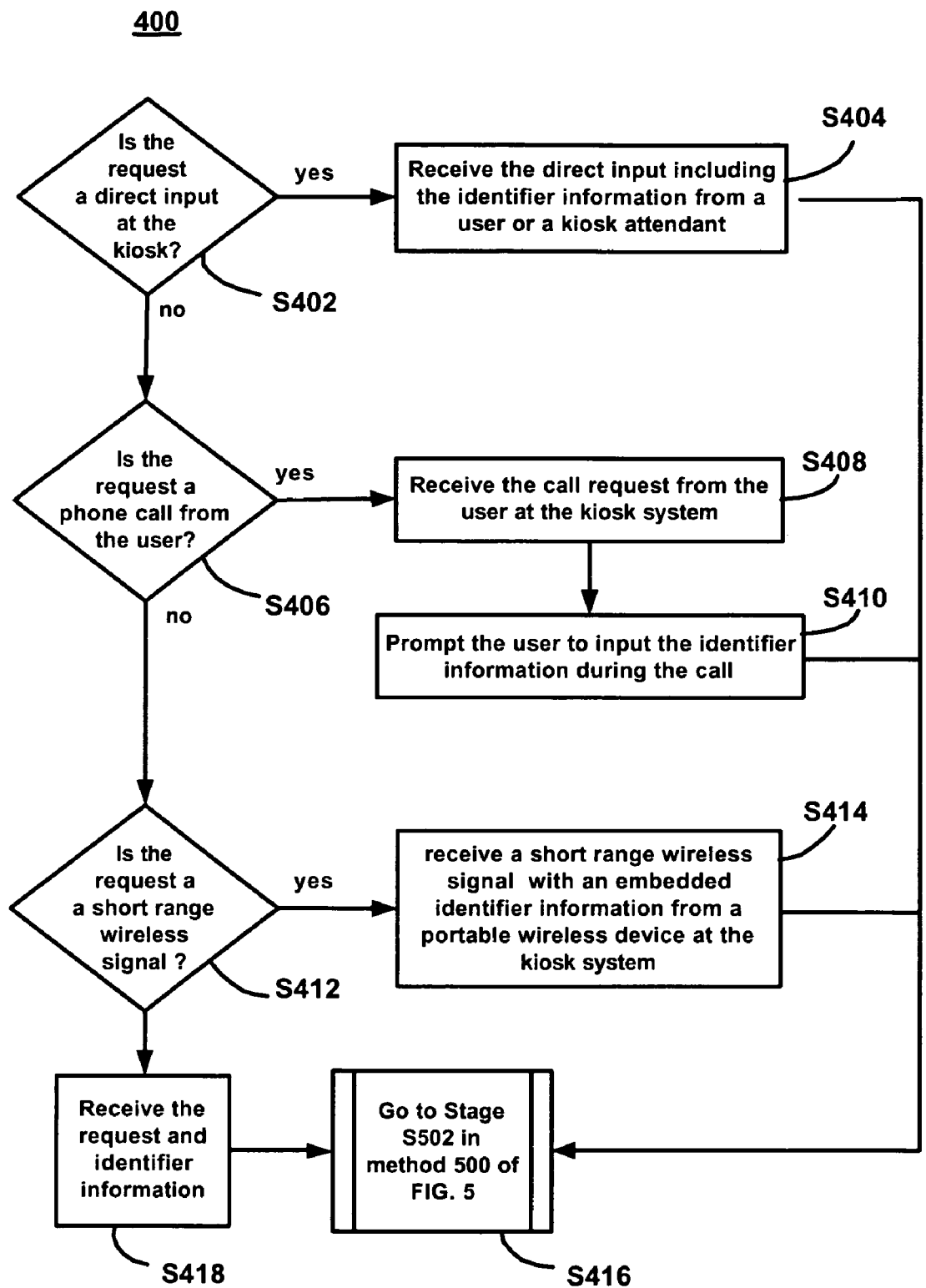
FIG. 4 illustrates a method for receiving a vehicle function request in accordance with the present invention.

FIG. 4 illustrates one embodiment of a method 400 for receiving a vehicle function request at the kiosk system 182 in accordance with the present invention. Method 400 describes three example techniques to provide a vehicle function request to the kiosk system 182. Other techniques are possible as is understood by those of skill in the art. The kiosk server 184, the kiosk server processor 188, the system databases 186, the kiosks 183, the key fobs 181, and a short-range wireless device (not shown) have stored in computer readable medium at least one computer program including computer readable code to perform the operations described with reference to method 400.

During stage S402, the kiosk system 182 determines if the vehicle function request is a direct input at the kiosk 183. If the vehicle function request is received as a direct input at the kiosk 183, the flow proceeds to stage S404.

During stage S404, the user or an attendant at the kiosk 183 inputs the identifier information into the kiosk 183. After the kiosk 183 receives a button-push at a keypad (not shown) to initiate the vehicle function request, the kiosk 183 prompts the user to enter the identifier information at a keypad on the kiosk 183. The prompt to the user can be provided as a menu on a display screen. The user-prompt can request one type of identifier information from the user via a keypad (not shown) at the kiosk 183. In one embodiment, the user-prompt provides a menu with a selection of types of identifier information, and instructs the user to select and to input one or more types of identifier information. In one embodiment, the user includes the desired vehicle function, such as a door unlock, with the direct input to initiate the vehicle function request. In another embodiment, the type of vehicle function being requested by the user is received with the identifier information.

After the direct input including identifier information is received at the kiosk 183, the method proceeds to stage S416. During stage S416, the method is directed to stage S502 in method 500 of FIG. 5.

If the vehicle function request is not received as a direct input at the kiosk 183, the flow proceeds to stage S406. During stage S406, the kiosk system 182 determines if the vehicle function request is received as a phone call from the user to an automated phone system (not shown) in the kiosk system 182. If the vehicle function request is received as phone call, the flow proceeds to stage S408. During stage S408, the call request from the user is received at the kiosk system 182. A user dials a number to initiate the vehicle function request phone call.

During stage S410, the automated phone call announces a menu to prompt the user to input identifier information and the vehicle location of the MVCU 110. A voice menu provides a choice of types of identifier information correlated with button pushes and the user selects one or more of the types of identifier information by one or more button-pushes on the keypad of the phone. After the button-push to select the type of identifier information, the user inputs the identifier information by a series of button-pushes on the phone keypad.

In one embodiment, the user inputs the identifier information by announcing the identifier information and the vehicle location. In this case, the automated phone system uses a speech recognition system (not shown) in the kiosk system 182 to translate the spoken identifier information into a digital signal in which the identifier information is embedded.

In one embodiment, the vehicle location includes an identifying number for a kiosk 183 in the vicinity of the MVCU 110. In another embodiment, the vehicle location includes an address for a garage. In yet another embodiment, the vehicle location includes cross streets and a city name for a parking lot.

Figure 5:
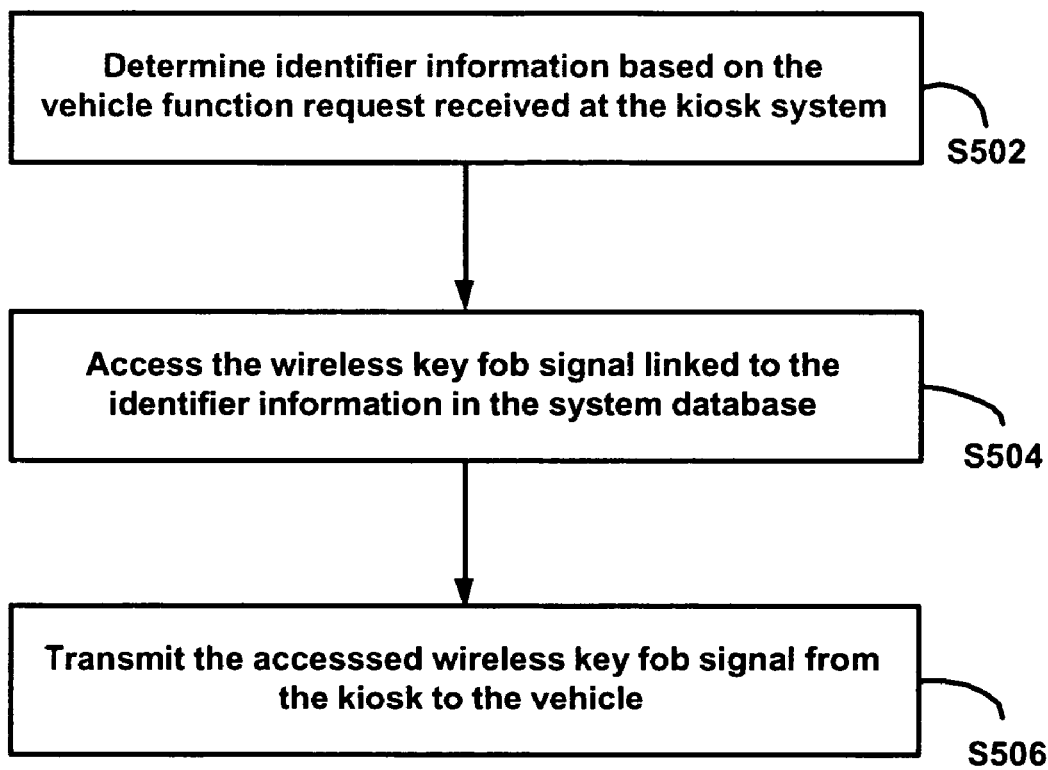
FIG. 5 illustrates a method for sending a wireless key fob signal from a kiosk system to a vehicle in accordance with the present invention.

After the identifier information is received at the kiosk system 182, the method proceeds to stage S416 and the method is directed to stage S502 in method 500 of FIG. 5.

If, during stage S406, the kiosk system 182 determines if the vehicle function request is not received as a phone call from the user, the flow proceeds to stage S412. During stage S412, the kiosk system 182 determines if the vehicle function request is received as a short-range wireless signal at a kiosk 183.

During stage S414, the kiosk 183 receives the short-range wireless signal with the embedded identifier information from a portable wireless device. A portable wireless device such as, a personal digital assistant (PDA) or other short-range wireless device (not shown) can be preprogrammed to transmit the short-range wireless signal to the kiosk antenna 185 to initiate the vehicle function request. The identifier information is embedded in the preprogrammed short-range wireless signal. The short-range wireless device can be a Wi-Fi and/or Bluetooth device as is known in the art. In this embodiment, the kiosk 183 and the transceivers in the kiosk antennae 185 includes a short-range wireless receiver chips that are compatible with the Wi-Fi and/or Bluetooth technologies of the portable wireless device. As used herein, the term "wi-fi" includes any radio transmission configured to broadcast within a limited range, such as lessthan one mile, and includes transmissions made under an industry standard, such as FCC part 15. "Wi-fi" includes 802.11 transmissions.

If, during stage S412, the kiosk system 182 determines the vehicle function request is not received as a short-range wireless signal at a kiosk 183, the method proceeds to stage S418. During stage S418, a vehicle function request including the identifier information is received at the kiosk system 182 by an alternative method. In one embodiment, the alternative method includes initiating the vehicle function request from a personal or user computer 150. In that case, the vehicle function request including identifier information is transmitted to the kiosk system 182 via one or more wireless carrier systems 140, one or more communication networks 142, one or more land networks 144, one or more client, personal or user computers 150 and/or one or more web-hosting portals 160. The flow proceeds to stage S416, and the method is directed to stage S502 in method 500 of FIG. 5.

FIG. 5 illustrates one embodiment of a method 500 for sending a wireless key fob signal from a kiosk system to an MVCU 110 in accordance with the present invention. The method 500 describes how to remotely operate a vehicle function on an MVCU 110 after the vehicle function request including the identifier information is received at the kiosk system 182. The kiosk server 184, the kiosk server processor 188, the system databases 186, the kiosks 183, transceivers in the kiosk antennae 185, and the MVCU 110 have stored in computer readable medium at least one computer program including computer readable code to perform the operations described with reference to method 500.

During stage S502, the kiosk system 182 determines the identifier information based on the received vehicle function request as described above with reference to method 400 of FIG. 4. The kiosk system 182 also determines the location of a kiosk 183 that is within the wireless transmission range of the MVCU 110 that requires remote operation of vehicle functions. If the identifier information was embedded in the short-range wireless signal as described above with reference to stage S414 in method 400 of FIG. 4, the kiosk system 182 extracts the embedded identifier information from the received signal.

During stage S504, the kiosk system 182 accesses the wireless key fob signal linked to the identifier information in the system database 186. The kiosk server processor 188 obtains the identifier information and searches the system database 186 for matching identifier information. In the system database 186, the identifier information is linked to the wireless key fob signal that was generated during stage S304 of method 300 in FIG. 3. When a match between the stored identifier information and the identifier information with the vehicle function request is found, the kiosk server processor 188 retrieves the wireless key fob signal linked to the stored identifier information.

During stage S506, the kiosk server 184 transmits the retrieved wireless key fob signal to the kiosk 183 and the kiosk 183 transmits the retrieved wireless key fob signal to the MVCU 110. The wireless key fob signal is wirelessly transmitted from the kiosk 183, via the kiosk antenna 185, to the MVCU 110. The MVCU 110, located within the wireless transmission range of the kiosk antenna 185, receives the wireless key fob signal at a key fob receiver. The key fob receiver is operable to initiate the vehicle function in the MVCU 110.

The kiosk 183 can receive the wireless key fob signal via one or more wireless carrier systems 140, one or more communication networks 142, and/or one or more land networks 144. In one embodiment, a building-antenna (not shown) near the kiosk 183 receives the wireless signal from the kiosk server 184. In this case, the building-antenna transceiver transmits the key fob signal, via a hardwire connection, to the kiosk 183 that is wirelessly accessible to the MVCU 110 associated with the key fob signal.

In one embodiment, the kiosk antenna 185 includes a plurality of antennae to provide uniform transmission in all directions. In another embodiment, the kiosk antenna 185 includes a single antenna to provide uniform transmission in all directions. In yet another embodiment, the kiosk antenna 185 includes a plurality of antennae to selectively transmit the wireless key fob signal in the direction of the MVCU 110 from a single one of the antennae. In one embodiment, the kiosk antenna 185 transmits the wireless key fob signal in a range of about 35 meters. In another embodiment, the kiosk antenna 185 transmits the wireless key fob signal in a range of about 300 meters.

In an exemplary kiosk system 182, at least one kiosk 183 is located on every floor of an underground parking garage (not shown). Each kiosk 183 has a hard wire connection to a building-antenna transceiver located on top of a building located over the underground parking garage.

Figure 6:
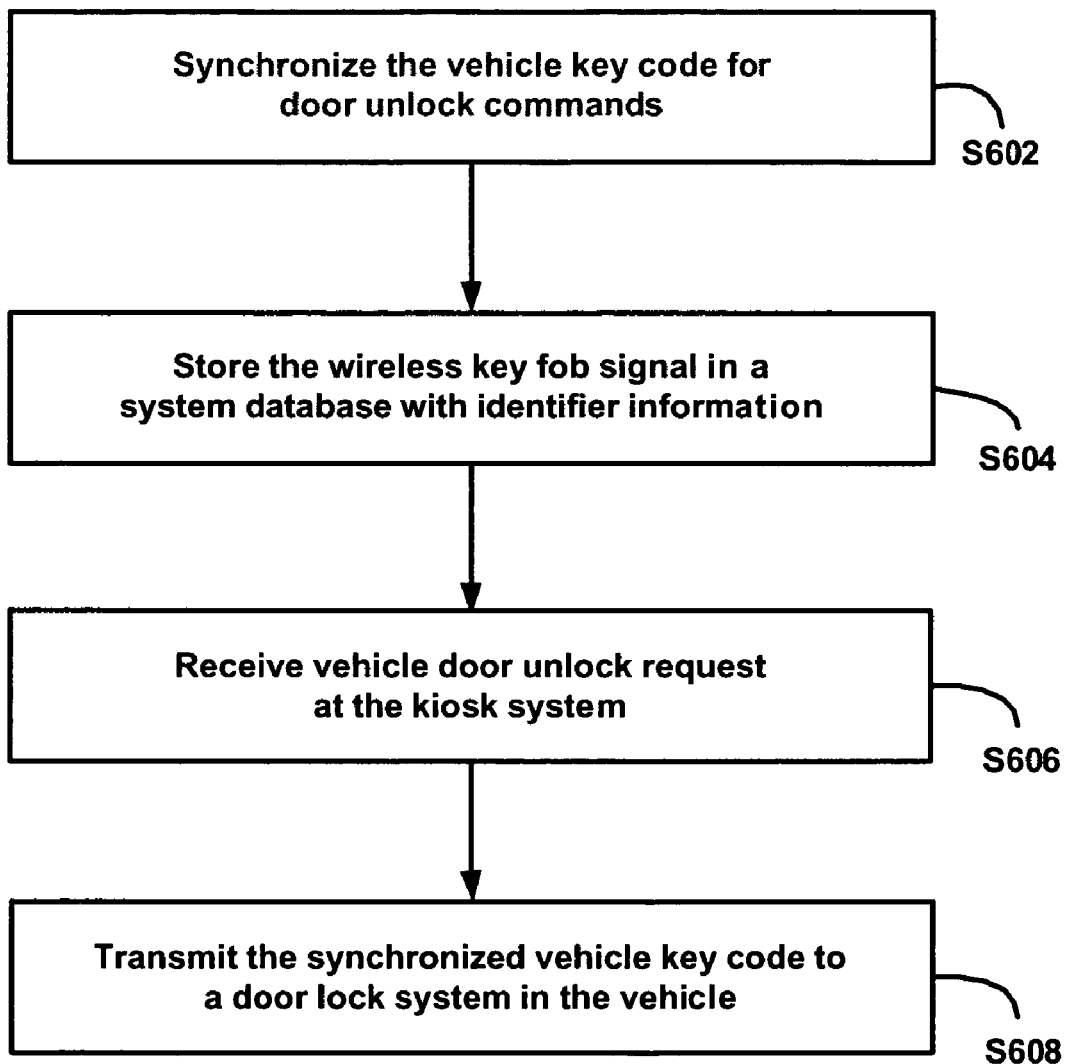
FIG. 6 illustrates a method for providing a vehicle door unlock request in accordance with the present invention.

FIG. 6 illustrates one embodiment of a method 600 for providing a vehicle door unlock request in accordance with the present invention. The kiosk server 184, the kiosk server processor 188, the system databases 186, the kiosks 183, transceivers in the kiosk antennae 185, the key fobs 181 and the MVCU 110 have stored in computer readable medium at least one computer program including computer readable code to perform the operations described with reference to method 600. Method 600 describes the method to unlock a door of an MVCU 110 in the vicinity of a kiosk 183 by providing a door unlock request to the kiosk system 182.

During stage S602, the kiosk system 182 synchronizes the vehicle key code for door unlock commands. As describe above with reference to stage S304 in method 300 of FIG. 3, the kiosk system 182 receives a wireless key fob signal associated with the enrollment request during the enrollment process. The wireless key fob signal includes a vehicle key code.

The vehicle key code is the wireless signal emitted when a user pushes the door unlock button of the key fob 181 in the vicinity of the MVCU 110 to unlock the vehicle door. The wireless vehicle key code signal includes a door unlock command. When a vehicle door is locked and a receiver in the door lock system receives a door unlock command, the hardware and software in the door lock system of the MVCU 110 operate to unlock the vehicle door.

The vehicle key code for a given key fob 181 is based on a rolling code technology in which the door lock system in the MVCU 110 is synchronized with each key fob 181. The rolling code synchronization is maintained between the key fob 181 and the door lock system as long as the key fob door unlock button is not pushed more than a predetermined number of times outside the wireless reception range of the MVCU 110. In one embodiment, in order to maintain the synchronization, the key fob door unlock button is not pushed more than twenty (20) times outside the wireless reception range of the MVCU 110.

The door lock system has settings for synchronizing with more than one key fob 181. In one embodiment the door lock system has settings for synchronizing with eight (8) key fobs 181.

If the user pushes the door unlock button of an extra key fob 181 in the wireless reception range of the kiosk antenna 185 during an enrollment process, the vehicle key code is received as part of the wireless key fob signal at the kiosk 183 and stored in the kiosk system 182. The user then refrains from using the extra key fob 181, which generated the vehicle key code, to unlock the MVCU 110 more than the preset number of times. This maintains the stored vehicle key code in synchronicity with the door lock system in the MVCU 110. In one embodiment, the user pushes the door unlock button of an unused setting in the key fob 181 during the enrollment process and then refrains from using the unused setting in the key fob 181 more than the preset number of times.

Other synchronizing technologies known in the art can be implemented for stage S602 of method 600.

During stage S604, the kiosk system 182 stores the synchronized signal vehicle key code, in the system database 186 with the identifier information according to the method described above with reference to stage S306 in method 300 of FIG. 3.

During stage S606, the kiosk system 182 receives a vehicle function request including a vehicle door unlock request from a user. The vehicle door unlock request is received and processed by the kiosk system 182 as described above for the vehicle function request with reference to methods 400 and 500 of FIG. 4 and FIG. 5, respectively.

During stage S608, the kiosk system 182 transmits the synchronized vehicle key code to a door lock system in the MVCU 110 based on the vehicle door unlock request. Specifically, the kiosk antenna 185 of kiosk 183 transmits the wireless vehicle key code signal, which includes a door unlock command, in the wireless reception range of the locked MVCU 110. The door lock system in the locked MVCU 110 includes a wireless receiver to receive the door unlock command. The hardware and software in the door lock system operate to unlock the vehicle door since the vehicle key code is synchronized to the door lock system in the MVCU 110.

In one embodiment, the kiosk system 182 includes kiosks 183 located in proximity to a plurality of vehicles, such a parking garage or a parking lot. In one embodiment, one or more kiosks 183 are positioned in order to provide wireless transmission to MVCUs 110 in all the parking spaces within the parking garage or parking lot.

In one embodiment, a user requests that the kiosk system 182 sound the horn and flash the lights of the MVCU 110 so the user can find the MVCU 110 in a parking garage or parking lot. In this case, all the kiosks 183 within a parking garage or parking lot can send the wireless key fob signal to ensure that the MVCU 110 receives the signal from at least one of the kiosks 183.

While the embodiments, of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A method for remotely operating vehicle functions, the method comprising:
   initiating enrollment of a vehicle that does not have a telematics unit into a kiosk system by inputting user identifying information to the kiosk system;
   receiving at least one wireless key fob signal at the kiosk system, the wireless key fob signal being sent from a key fob associated with the vehicle and configured to operate the vehicle functions;
   associating the received wireless key fob signal with the identifying information at the kiosk system;
   receiving a vehicle function request at the kiosk system;
   comparing an identifier input with the vehicle function request with the previously input user identifying information; and
   when the identifier input with the vehicle function request with the previously input user identifying information matches, sending the wireless key fob signal from the kiosk system to the vehicle based on the vehicle function request, thereby initiating a vehicle function in the vehicle which is responsive to the wireless key fob signal from the kiosk system.

2. The method of claim 1, wherein receiving the at least one wireless key fob signal at the kiosk system further comprises:
   storing the wireless key fob signal linked with the user identifier information in a system database, wherein the user identifier information includes one or more of a vehicle identification number, a customer number associated with the vehicle, a social security number, a password, a security code and a personal identification number.

3. The method of claim 1, wherein receiving the vehicle function request at the kiosk system comprises:
   receiving direct input at a kiosk in the kiosk system by one of a user or a kiosk attendant, wherein the direct input includes the identifier.

4. The method of claim 1, wherein receiving the vehicle function request at the kiosk system comprises:
   receiving a call request from a user; and
   prompting the user to input the identifier.

5. The method of claim 1, wherein receiving the vehicle function request at the kiosk system comprises:

receiving a short-range wireless signal from a portable wireless device at the kiosk system, wherein the identifier is embedded in the short-range wireless signal.

6. The method of claim 1, wherein sending the wireless key fob signal from the kiosk system to the vehicle based on the vehicle function request comprises:

accessing the wireless key fob signal linked to the user identifier information in a system database; and transmitting the accessed wireless key fob signal from the kiosk to the vehicle.

7. The method of claim 1, wherein the wireless key fob signal includes a vehicle key code, wherein the vehicle function request is a vehicle door unlocking request, and wherein the method farther comprises:

synchronizing the vehicle key code for door unlock commands during the enrollment; and storing the synchronized vehicle key code in a system database with the user identifier information.

8. The method of claim 7, wherein sending the wireless key fob signal from the kiosk system to the vehicle based on the vehicle function request comprises:

transmitting the synchronized vehicle key code to a door lock system in the vehicle based on the vehicle door unlock request.

9. The method of claim 7, wherein the vehicle key code is for an unused setting in the key fob.

10. A system for remotely operating vehicle functions, the system comprising:

means for initiating enrollment of a vehicle that does not have a telematics unit into a kiosk system by inputting user identifying information to the kiosk system;

means for receiving at least one wireless key fob signal at the kiosk system, the wireless key fob signal being sent from a key fob associated with the vehicle and configured to operate the vehicle functions;

means for receiving a vehicle function request at the kiosk system;

means for comparing an identifier input with the vehicle function request with the previously input user identifying information; and means for sending, when the identifier input with the vehicle function request with the previously input user identifying information matches, the wireless key fob signal from the kiosk system to the vehicle based on the vehicle function request, thereby initiating a vehicle function in the vehicle which is responsive to the wireless key fob signal from the kiosk system.

11. The system of claim 10, the system further comprising:

means for synchronizing a vehicle key code embedded in the wireless key fob signal for door unlock commands; and means for storing the synchronized vehicle key code in a system database with the user identifier information.

12. The system of claim 10, wherein the means for receiving the at least one wireless key fob signal at the kiosk system further comprises:

means for storing the wireless key fob signal linked with the user identifier information in a system database, wherein the user identifier information includes one or more of a vehicle identification number, a customer number associated with the vehicle, a social security number, a password, a security code and a personal identification number.

13. The system of claim 10, wherein the means receiving the vehicle function request at the kiosk system comprises:

means for receiving direct input at a kiosk in the kiosk system by one of a user or a kiosk attendant, wherein the direct input includes the identifier.

14. The system of claim 10, wherein the means for receiving the vehicle function request at the kiosk system comprises:

means for receiving a call request from a user; and means for prompting the user to input the identifier.

15. The system of claim 10, wherein the means for receiving the vehicle function request at the kiosk system comprises:

means for receiving a short-range wireless signal from a portable wireless device at the kiosk system, wherein the identifier is embedded in the short-range wireless signal.

* * * * *